United States Patent
Chen et al.

(10) Patent No.: US 7,424,194 B2
(45) Date of Patent: Sep. 9, 2008

(54) SINGLE POLARIZATION FIBER AND METHOD OF EVALUATING FIBER CUTOFF WAVELENGTHS USING OPTICAL TIME DOMAIN REFLECTOMETRY

(75) Inventors: Xin Chen, Corning, NY (US); Alan Frank Evans, Beaver Dams, NY (US); Joohyun Koh, Painted Post, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/331,905

(22) Filed: Jan. 13, 2006

(65) Prior Publication Data

US 2007/0165978 A1  Jul. 19, 2007

(51) Int. Cl.
  *G02B 6/02*  (2006.01)
(52) U.S. Cl. .................................................. 385/123
(58) Field of Classification Search ................ None
   See application file for complete search history.

(56) References Cited

U.S. PATENT DOCUMENTS 5,848,204 A * 12/1998 Wanser ..................... 385/12
6,946,646 B2 * 9/2005 Chen et al. ............. 250/227.17
2002/0069677 A1 * 6/2002 Berkey ......................... 65/403
2005/0244118 A1 * 11/2005 Berkey et al. ................ 385/123

OTHER PUBLICATIONS

"A Broad-Band Single Polarization Optical Fiber", Michael J. Messerly, et al; Journal of Lightwave Technology; vol. 9, No. 7, Jul. 1991, pp. 817-820.
A Single-Polarization Fiber:, J. R. Simpson, et al; Journal of Lightwave Technology, vol. LT-1, No. 2, Jun. 1983; pp. 370-374.
"Stress-Induced Single-Polarization Single-Mode Fiber", W. Eickhoff; Optics Letters, Dec. 1982; vol. 7, No. 12; pp. 629-631.
"Photonic Crystal Fiber"; Hirokazu Kubota; Proc. of SPIE vol. 5623; pp. 292-297.
"Broadband Single-Polarization Photonic Crystal Fiber"; J. R. Folkenberg, et al; Optics Letters, vol. 30, No. 12; Jun. 15, 2005.

* cited by examiner

*Primary Examiner*—Sung Pak
*Assistant Examiner*—Hoang Tran
(74) *Attorney, Agent, or Firm*—Svetlana Z. Short

(57) ABSTRACT

A method for measuring fundamental mode cutoff wavelength of single polarization fiber comprising: (i) launching pulsed light of at least one wavelength $\lambda_i$ into one end of the single polarization fiber; (ii) measuring backscattered light intensity corresponding to said wavelength to obtain the backscattered light intensity as a function of fiber position, wherein the backscattered light propagates through the same end of the fiber; and (iii) determining at least one cutoff wavelength and the corresponding position within said fiber for the cutoff wavelength, based on a specified threshold light intensity level.

18 Claims, 11 Drawing Sheets

CL₂ —[V]—
He —[V]—

114
116
114a 114a
118
122
120

SINGLE POLARIZATION FIBER AND METHOD OF EVALUATING FIBER CUTOFF WAVELENGTHS USING OPTICAL TIME DOMAIN REFLECTOMETRY

BACKGROUND OF THE INVENTION

1. Field of the Invention

The present invention relates generally to optical fibers, and particularly to a method for distributed measurement of fundamental mode cutoff wavelengths in optical fibers. This method is especially suitable for measuring fundamental mode cutoff wavelengths of optical fibers which exhibit single polarization characteristics.

2. Technical Background

Optical fiber has become a favorite medium for telecommunications due to its high capacity and immunity to electrical noise. Single polarization optical fibers are useful for ultra-high speed transmission systems or for use as a coupler fiber for use with, and connection to, optical components (lasers, EDFAs, optical instruments, interferometric sensors, gyroscopes, etc.). Single polarization fibers (SPFs) propagate light in one, and only one, of two orthogonally polarized polarizations while suppressing the other polarization by increasing its transmission loss.

Single polarization fibers are specially designed optical fibers where each polarization mode reaches the cutoff wavelength at different wavelengths. The wavelength range from the wavelength that the first polarization mode reaches the cutoff to the wavelength that the second polarization mode reaches the cutoff is called single polarization band (SPB). Such single polarization fibers generally have an azimuthal asymmetry of the refractive index profile.

Different designs have been used to accomplish the single polarization performance. See for example, Michael J. Messerly et al, "A Broad-band single polarization optical fiber" J. Lightwave Technol. 9 (7), 817-820 (1991), J. R. Simpson et al, "A single-polarization fiber", J. Lightwave Technol., LT-1 (2), 370-374 (1983); W. Eickhoff, "Stress-induced single-polarization single-mode fiber", 7 (12) 629-631 (1982); Hirokazu Kubota, "Photonic Crystal Fiber", Proc. Of SPIE, 292-297 (SPIE, Bellingham, Wash.); J. R. Folkenberg et al, "Broadband single-polarization photonic crystal fiber" (Optic Letters 30 (12); 1446-1448 (2005)).

The fiber cutoff wavelengths associated with each polarization mode is a critical fiber attribute that describe the performance of the single polarization fibers. Knowledge of fiber's fundamental mode cutoff wavelengths, the width of its single polarization band (SPB), and/or the central wavelength of the SPB are important factors in the implementation of the single polarization fiber in the state-of-art fiber optic transmission systems and devices.

It is well known that the physical properties of the optical fibers can vary as the fiber is being drawn. This influences optical properties, including the changes to the cutoff wavelengths and to the SPB. Thus, variability fundamental mode cutoff wavelengths within the length of the same fiber makes it difficult to predict the precise length of the fiber segment that needs to be cut off from the long length of fiber to provide the fiber with the predetermined cutoff wavelengths.

Measurement schemes for measuring fiber cutoff wavelengths are known. For example, in the above mentioned literature, the fundamental mode cutoff associated with each polarization mode are obtained through measuring the transmission spectrum of the fiber using broadband or white light source. The measurement is conducted in by cutting a short piece of fiber and performing the transmission measurement on this piece of fiber. This measurement technique is destructive because once cut of from the rest of the fiber, the measured section fiber is usually discarded.

Single Polarization fiber is manufactured to have its SPB in a specific wavelength range and thus has to have predetermined fundamental mode cutoff wavelengths. Unfortunately, screening fiber cutoff wavelengths on an entire length of fiber can not be done with the destructive measurement method. In addition, when the fiber cutoff wavelengths' values are beyond a specified range, the fiber is subsequently rejected. Conversely, when the fiber segment under test shows that the fundamental mode cutoff wavelengths are within the acceptable level, it is natural to assume that cutoff wavelength of the entire lengths of fiber are in the acceptable range. However, in reality, the fiber cutoff wavelengths change along the length of the fiber and consequently can vary from one segment along the length of the fiber to another. The whole fiber can then be considered as a concatenation of many segments of fibers. Thus, acceptable cutoff wavelengths measured on the fiber segment does not guarantee that the rest of the fiber has acceptable cutoff wavelengths. Therefore, there is a need for a different screening method that can take the distributed (i.e. variable) nature of fiber cutoff wavelengths into account.

Furthermore, the single polarization window is very sensitive to any change in fiber geometry such as core minor and major axes and (if the SP fiber utilizes air holes) hole diameter. It is very difficult to make a fiber preform and draw it into a standard fiber diameter such as 125 µm with a single polarization window right on target. It is necessary to change the draw conditions such as draw speed, tension and temperature, as well as pressure in the air hole to tune the single polarization window. One way of doing the tuning is to take a sample of the drawn fiber, measure its single polarization window, and then adjust the draw conditions accordingly. This process is repeated until the target single polarization window is reached. This process works well if the preform is perfectly uniform. However, a practical preform has always small random variations, which move the single polarization window significantly. As a result, the average yield of targeted single polarization fibers can be very low.

Accordingly, alternative methods that can conduct the measurements distributedly and non-destructively for identifying fiber cutoff wavelengths would be of great value to the industry in that such methods would reduce fiber costs, and therefore overall manufacturing costs for single polarization optical fibers. In addition, a process of making single polarization fiber with increased yield would be of great value to the industry.

SUMMARY OF THE INVENTION

According to one aspect of the present invention, one embodiment of a method for measuring fundamental mode cutoff wavelength of an optical fiber comprises: (i) sequentially launching pulsed light of multiple wavelengths $\lambda_i$ from one end of the fiber; (ii) sequentially measuring backscattered light intensity corresponding to each of said multiple wavelengths to obtain the backscattered light intensity as a function of fiber position at each wavelength, wherein the backscattered light propagates through the same end of the fiber; and (iii) determining the cutoff wavelengths and the corresponding positions within said fiber for each of the cutoff wavelengths, based on a specified threshold light intensity level.

According to some embodiments the method for measuring fundamental mode cutoff wavelength(s) of an optical fiber utilizes either a tunable optical time domain reflectometer (OTDR) or an OTDR that can operate at multiple wavelengths to obtain the fundamental mode cutoff or fundamental mode cutoff associated with each polarization mode along the fiber length or distributedly.

One advantage of the present method is that it can be incorporated in the fiber manufacturing process by providing online monitoring of the single polarization window during the fiber draw process.

According to one embodiment a method for measuring fundamental mode cutoff wavelength of a single polarization fiber according to one aspect of the present comprises: (i) launching pulsed light of at least one wavelength $\lambda_i$ into one end of the single polarization fiber; (ii) measuring backscattered light intensity corresponding to said wavelength to obtain the backscattered light intensity as a function of fiber position, wherein the backscattered light propagates through the same end of the fiber; and (iii) determining at least one cutoff wavelength and the corresponding position within said fiber for the cutoff wavelength, based on a specified threshold light intensity level.

A preferred device for both emitting the pulse radiation and measuring the radiation which is backscattered or reflected back through the fiber is an optical time domain reflectometer (OTDR). While OTDRs have been used to measure a variety of properties of optical fibers, they are most commonly employed to measure fiber attenuation and to identify locations where breaks or discontinuities occur in the fiber. By OTDR as used herein, we mean a device which is capable of sending a light down an optical waveguide fiber and observing the small fraction of light that is scattered back towards the detector. Typical OTDRs can resolve the intensity of radiation backscattered along the length of the fiber. Most of the OTDRs achieve this by sending pulsed radiation into the fiber under test and measuring the backscattered radiation at a given timing. While typical pulse-widths may range from 0.5 meters (5 nanoseconds) to 2000 meters (20 microseconds), the present invention preferably employs pulse widths of between about 5 and 200 ns, more preferably between about 30 and 150 ns, and most preferably between about 50 ns and 100 ns. Preferably, the OTDR is a polarization. OTDR, which is basically an OTDR capable of emitting polarized radiation and analyzing the polarized radiation from backscattered light.

One embodiment of the method in accordance with the present invention involves identifying changes in fundamental mode cutoff wavelength(s) along the length of the fiber. This can be accomplished, for example, by analyzing backscattered light intensity changes along the length of the fiber. In one embodiment, light of multiple wavelengths is launched into a fiber without any polarization control. The backscattered light intensity for each wavelength is measured along the fiber length. When the light intensity is dropped (from the linear propagation loss region or from the initial launched intensity) by 3-7 dB, the longer fundamental mode cutoff wavelength $\lambda c_2$ and the location of this cutoff wavelength is determined.

In another embodiment, linearly polarized light of multiple wavelengths is launched into an optical fiber with the polarization axis of the light aligned with one polarization axis of the fiber. The backscattered light intensity for each wavelengths is then measured along the lengths of the fiber. When the backscattered light intensity drops by 3-7 dB, we determine the cutoff wavelength and its location along the lengths of the fiber for the given polarization mode. Thus, both cutoff wavelengths, as well as the width of single polarization SP window can be determined along the fiber length.

In yet other embodiments, the OTDR technique is applied to a fiber that is being drawn to provide an online monitoring and/or control of the fiber's fundamental mode cutoff wavelength(s). In particular, these embodiments may utilize tapered core preform to enable monitoring of the cutoff wavelengths. The draw conditions are adjusted while the fiber is being drawn based on the measurements to achieve the desired single polarization window.

Thus, according to one aspect of the present invention, a single polarization fiber with a changing fundamental cutoff wavelength has a slightly tapered core such that the fundamental mode cutoff wavelengths shift monotonically along the length of the fiber.

DETAILED DESCRIPTION OF THE PREFERRED EMBODIMENTS

Figure 1:
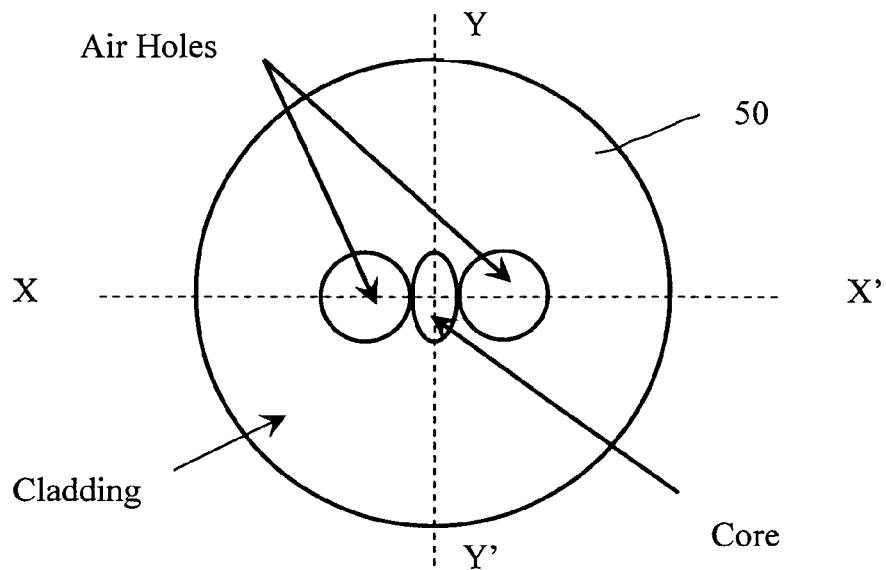
FIG. 1 illustrates the cross section layout a typical single polarization fiber with dual air holes.

The methods according to the embodiments of the present invention described herein are applicable to measurements of the cutoff wavelengths of single polarization fibers. A cross section layout of a particular design of single polarization fibers is illustrated in FIG. 1. Different designs of single polarization fibers SPF exist and they all have similar fundamental mode cutoff wavelength(s) sensitivity characteristics. The single polarization window (SPW=$\lambda_{c2}$–$\lambda_{c1}$) is very sensitive to any change in fiber geometry such as change(s) in the size of fiber core minor and major axes and air hole diameters. It is very difficult to make a preform and draw it into a standard fiber diameter (e.g., 125 µm) with a single polarization window right on target. The drift of fundamental mode cutoff wavelength occurs in the optical fibers due to slight variation in fiber cross-section geometry. A long fiber can be cut into short fiber pieces. The fundamental mode cutoff wavelengths near each end of the fiber can be measured by utilizing transmission measurements to measure the cutoff wavelengths on two short samples (1 to 2 m) of this fiber that were cut off from the first and second ends of that fiber. This can help us to judge the possible trend of the drifting (of fundamental mode cutoff wavelengths) of the given fiber. However, it is not guaranteed that the drift in each segment of fiber is uniform and toward one direction. We need to perform the distributed cutoff wavelengths measurement to make further judgment of the behavior and variability characteristics of the fundamental mode cutoff wavelengths along the lengths of the fiber, and in order to avoid cutting fiber too many times. Note that for a commercial delivery the fiber length must have a sufficiently long length (for example 5 to 10 meters, or longer) and that 1 to 2 meter sections of the fiber are generally discarded.

Accordingly, a method for measuring fundamental mode cutoff wavelength invention of single polarization fiber according to one aspect of the present comprises the steps of: (i) sequentially launching pulsed light of multiple wavelengths $\lambda_i$ from one end of the fiber; (ii) sequentially measuring backscattered light intensity corresponding to each of said multiple wavelengths to obtain the backscattered light intensity as a function of fiber position at each wavelength, wherein the backscattered light propagates through the same end of the fiber; and (iii) determining the cutoff wavelengths and their corresponding positions within said fiber for each of the cutoff wavelengths, based on a specified threshold light intensity level.

More specifically, the first wavelength $\lambda_1$ is launched from one end of the fiber and the backscattered light intensity corresponding to this wavelength is measured as a function of fiber position within the fiber. After this measurement a second wavelength $\lambda_2$ is launched through the same fiber end and the backscattered light intensity corresponding to this wavelength $\lambda_2$ is measured as a function of fiber position within the fiber. Then a third wavelength $\lambda_3$ is launched through the same fiber end and the backscattered light intensity corresponding to this wavelength $\lambda_3$ is measured as a function of fiber position within the fiber. This process is preferably repeated for several wavelengths, until it is done for the final wavelength $\lambda_i$. Preferably i>5, more preferably i>7. Finally, the fundamental mode cutoff wavelengths and their corresponding positions within the fiber, are determined based on a specified threshold light intensity level.

Figure 5:
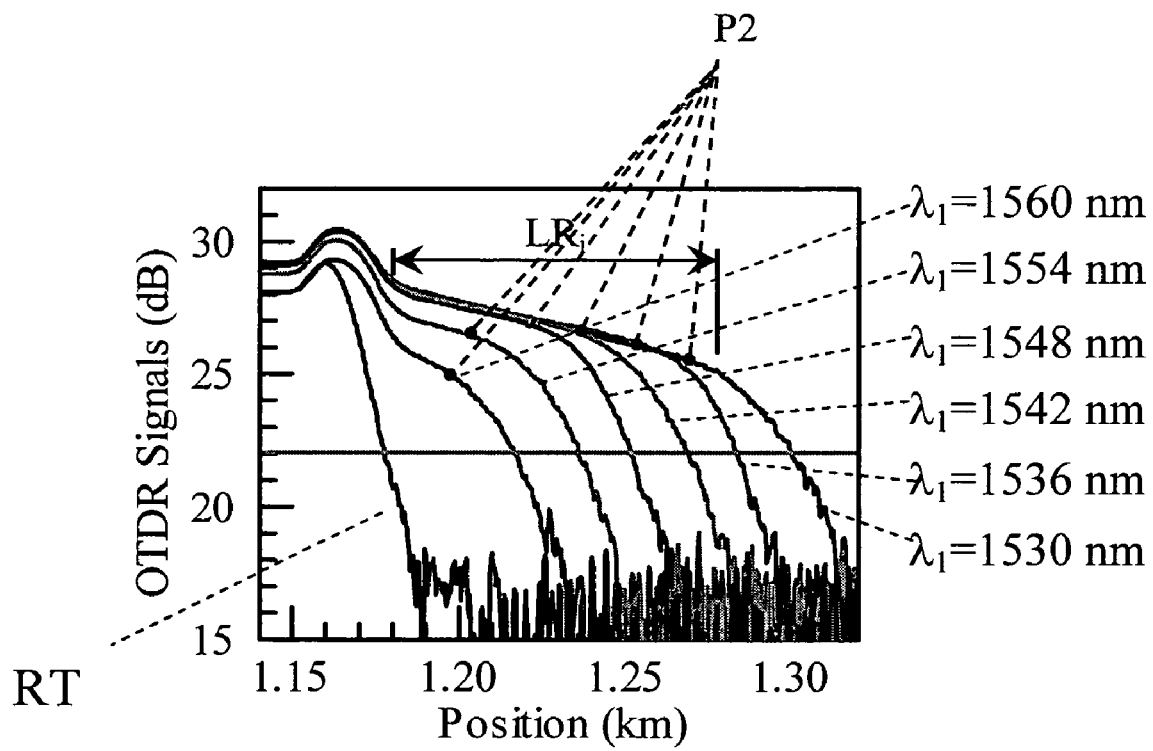
FIG. 5 illustrates the OTDR trace obtained by using 6 different wavelengths, i.e., 1530 nm, 1536 nm, 1542 nm 1548 nm, 1554 nm and 1560 nm.

One preferred method in accordance with the present invention involves identifying changes in fundamental mode cutoff wavelength(s) along the length of the fiber. This can be accomplished, for example, by analyzing backscattered light intensity changes along the length of the fiber. In one embodiment, light of multiple wavelengths is launched into a fiber without any polarization control. The backscattered light intensity for each wavelength is measured along the fiber length. It is noted that when the wavelength of the launched light is lower (i.e., shorter) than that of the fundamental mode cutoff wavelength, the intensity of backscattered light collected by the tunable OTDR device 10 decreases linearly within the fiber length due to fiber attenuation. Thus, when the light intensity is dropped nonlinearly, for example by 3-7 dB from the measured back-scatter intensity in the linear propagation loss region LR, as shown in FIG. 5 (or, alternatively, or from the initial launched intensity), this intensity drop corresponds to the longer cutoff wavelength $\lambda_{c2}$ and the location of this cutoff wavelength within the fiber is determined.

In another embodiment, polarized light of multiple wavelengths is launched into an optical fiber with the linear polarization direction of the light aligned with one polarization axis X-X' of the fiber 50, for example the horizontal axis across the fiber core and the air holes, as shown in FIG. 1. The backscattered light intensity for each wavelength is then measured along the length of the fiber. Thus, when the backscattered light intensity drops by 3 dB to 7 dB relative to the end of the linear propagation loss region LR for the particular wavelength, we determine the cutoff wavelength and its location along the fiber length for the given polarization mode. Then the measurement is repeated for the other polarization axis of the fiber 50, for example Y-Y', the vertical axis situated across the fiber core, as shown in FIG. 1. Thus, both cutoff wavelengths, as well as the width of single polarization SP window can be determined along the fiber length.

In yet other embodiments, the described fundamental mode cutoff wavelength method is applied to a fiber that is being drawn to provide an online monitoring and/or control of the fiber's fundamental mode cutoff wavelength(s). In particular, these embodiments utilize tapered core preform to enable monitoring of the cutoff wavelengths. The draw conditions are adjusted while the fiber is being drawn based on the measurements to achieve the desired single polarization window.

A preferred device for both emitting the pulse radiation and measuring the radiation which is backscattered or reflected back through the fiber is an optical time domain reflectometer (OTDR). While OTDRs have been used to measure a variety of properties of optical fibers, they are most commonly employed to measure fiber attenuation and to identify locations where breaks or discontinuities occur in the fiber. By OTDR as used herein, we mean a device which is capable of sending a light down an optical waveguide fiber and observing the small fraction of light that is scattered back towards the detector. Typical OTDRs can resolve the intensity of radiation backscattered along the length of the fiber. Most of the OTDRs achieve this by sending pulsed radiation into the fiber under test and measuring the backscattered radiation at a given timing. While typical pulse-widths may range from 0.5 meters (5 nanoseconds) to 2000 meters (20 microseconds), the present invention preferably employs pulse widths of between about 5 and 500 ns, more preferably between about 30 and 150 ns, most preferably between 50 and 100 ns. Preferably, according to one aspect of the present invention, the OTDR is a polarization OTDR, which is basically an OTDR capable of emitting polarized radiation and analyzing the polarized radiation from backscattered light.

First Embodiment of the Present Invention

Figure 2:
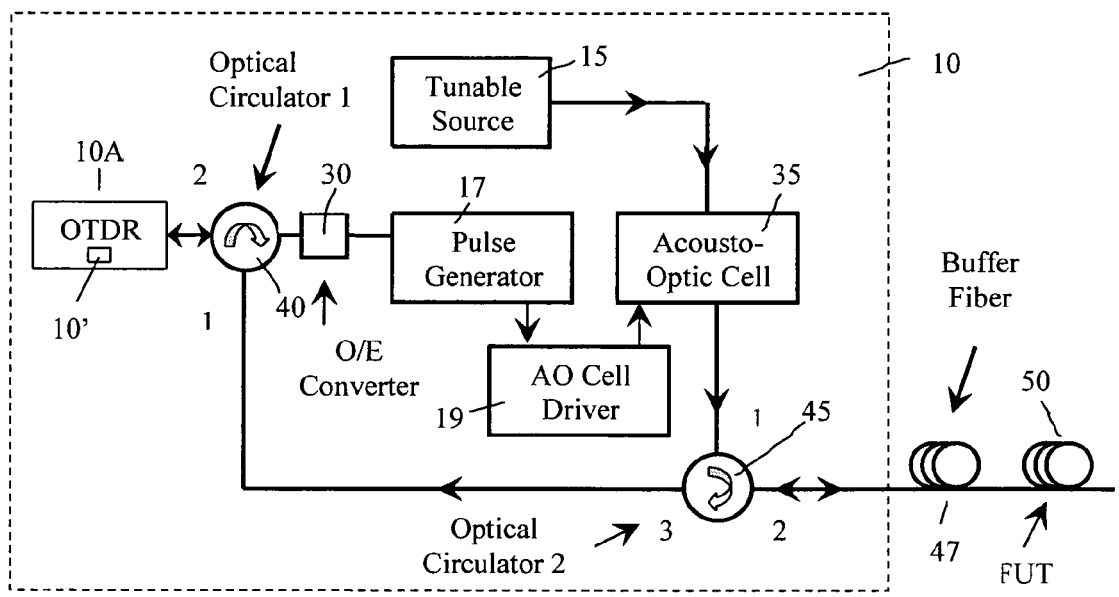
FIG. 2 illustrates the schematic of a tunable OTDR.

In this embodiment, the method of measuring the fundamental mode cutoff of the single polarization fiber is achieved by using a tunable OTDR device 10 (see FIG. 2). Tunable OTDR device 10 is an OTDR device that can run OTDR operation at different wavelength (tunable wavelength) within a specified wavelength range. Tunable OTDR devices are not commercially available. In order to gain the wavelength tunability, we modify a commercial OTDR device 10A to produce a tunable OTDR device 10. The schematic illustration of one embodiment of the tunable OTDR device 10 is shown in FIG. 2, which includes a commercial OTDR device 10A that operated at a fixed wavelength of 1550 nm. To gain the wavelength tunability, we utilized a tunable wavelength light source 15, which outputs continuous wave (CW) light at a specified wavelength. This light will then be fed to a modulator, for example an acousto-optical cell, which provides a "chopping" action to create pulses of light. The timing and duration of the "chopping" are controlled by the pulse generator 17 as triggered by the optical pulse train output from the commercial OTDR device 10A at 1550 nm.

Figure 3:
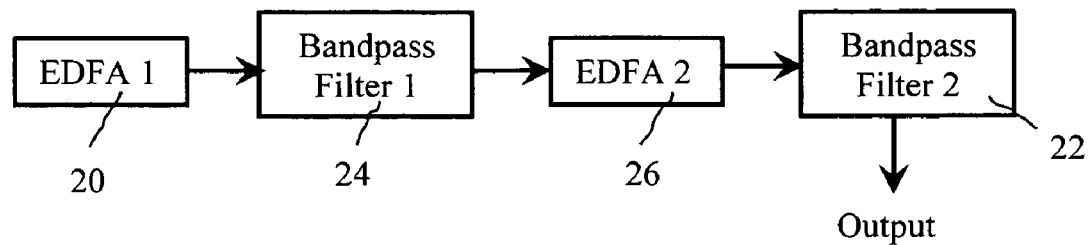
FIG. 3 illustrates one version of the implementation of tunable light source used in the tunable OTDR.

There are many ways to configure the tunable source 15. In FIG. 3, we illustrate one embodiment of the tunable source 15 that can be utilized in the tunable OTDR device 10. Two light amplifications stages 20, 26 have been used to provide sufficient output power. Two bandpass filters 24, 26 have been used to filter out light at unwanted wavelengths. It should be noted that in order to overcome the coherence effect, the light source 15 should preferably have a linewidth of at least of 0.5 nm. This can be achieved by choosing a bandpass filter 22, 24 with the desired bandpass linewidth. In other embodiments, the light pulse has a linewidth greater than 1 nm. In the present embodiments, linewidth is defined at 3 dB below pulse peak intensity. The optical pulse train from the commercial OTDR device 10A (See FIG. 2) is utilized as a triggering source for generating electronic pulse train by the pulse generator 17, by routing optical signal provided by the OTDR device 10A through an O/E (optical to electronic) pulse converter 30. The electronic pulses regenerated from the pulse generator 17 are fed into the driver unit 19 of the acousto-optic cell 35 to provide proper level of current and power to operate the acousto-optic cell 35. The electronic pulse signals drive the acousto-optic cell 35 to generate a light pulse train similar to that provided by the OTDR device 10A, but at different wavelengths, as provided by the tunable light source 15. Two optical circulators 40, 45 have been used to direct the newly generated pulsed light into the optical fiber 50 under test, and further guide the backscattered light into the OTDR device 10A included in the tunable OTDR device 10, reaching OTDR detector 10'. That is, the two circulators 40, 45 that are configured to loop the pulses of light emitted by the OTDR device 10 to the fiber under test. As a result of Rayleigh backscattering, some of the light is "back reflected" or "back scattered" through the fiber towards the OTDR device 10. Note that in an optical circulator, light can travel from port 1 to port 2, and from port 2 to port 3 and no other optical paths are possible because the direction of light travel from port to port is unidirectional. Thus, the OTDR device 10 is capable of sending pulses of laser light (at different wavelengths) down to the optical fiber 50. The OTDR device 10 thus injects a series of optical pulses into the optical fiber 50 under test, and extracts from the same end of the fiber, light that is scattered back. The intensity of the return pulses (for each of the wavelengths) is measured and integrated as a function of time and is plotted as a function of fiber length.

Figure 4A:
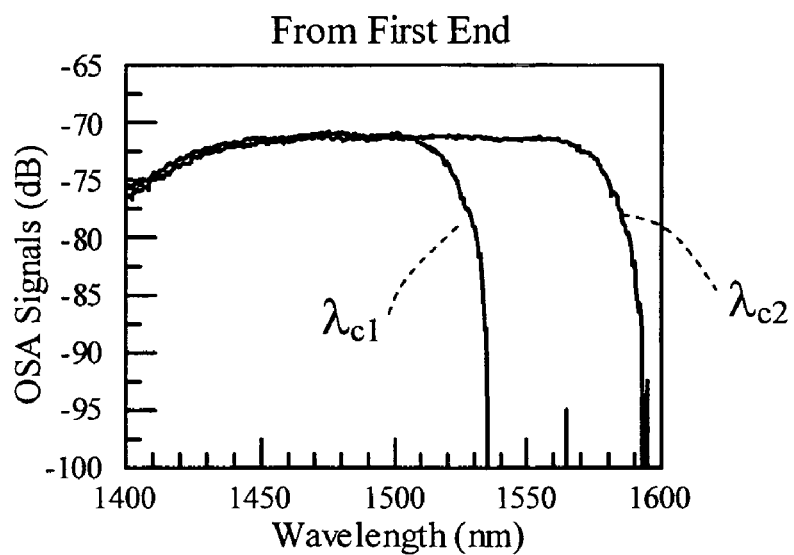
FIG. 4a illustrates the cutoff wavelengths associated with each polarization mode measured in a piece of single polarization fiber that was cut from the first end of that fiber.
Figure 4B:
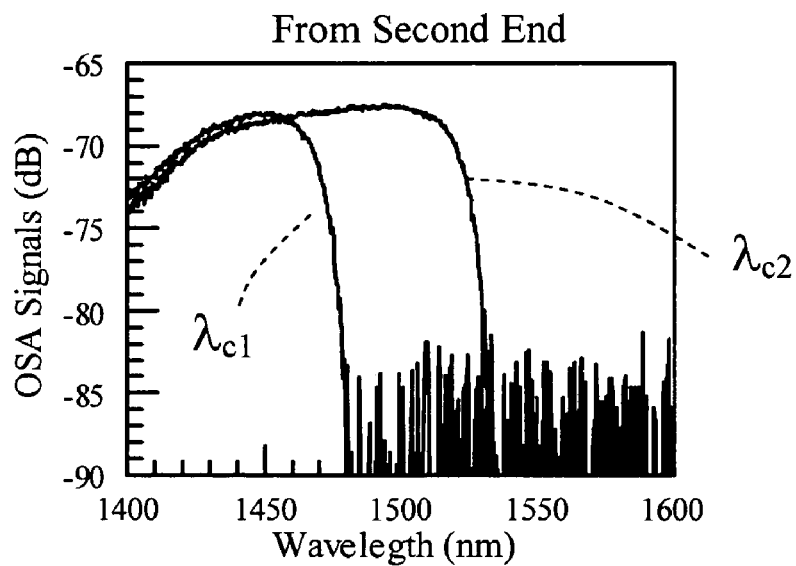
FIG. 4b illustrates the cutoff wavelengths associated with each polarization mode measured in a piece of single polarization fiber that was cut from the second end of that fiber.

In the following paragraphs, we show one embodiment of the present invention that utilizes the tunable OTDR device 10 to measure the distributed cutoff wavelength along the single polarization fiber. Prior to the OTDR measurement, short (2 meter) portions of the optical fiber 50 have been cut off from both ends of the fiber 50, and were utilized for transmission measurement of their fundamental mode cutoff wavelengths associated with each polarization mode. The results are shown in FIGS. 4a and 4b. FIG. 4a depicts a measurement from the fiber section cut off from the first end of the optical fiber 50. FIG. 4b depicts a measurement from the fiber section cut off from the second end of the optical fiber 50 and the vertical axis of these two figures depict back-scattered light transmission intensity (labeled OSA signal). These Figures show that for each polarization mode, the fundamental mode cutoff is reached at different wavelengths. The wavelengths in between the two fundamental mode cutoff wavelengths $\lambda_{c1}$, $\lambda_{c2}$ correspond to the single polarization band SPB that only allows light to propagate in only one polarization mode. We refer to the fundamental mode cutoff wavelength reached at a shorter wavelength as cutoff1 or $\lambda_{c1}$ and the fundamental mode cutoff wavelength reached at the longer wavelength as cutoff2 or $\lambda_{c2}$. Comparing the measurement results from both fiber ends (see FIGS. 4a and 4b), we see that the fundamental mode cutoff wavelengths are significantly shorter in the second section of the optical fiber 50. Thus, we may assume that within the fiber 50 the fundamental mode cutoff wavelengths experience a significant shift toward the shorter wavelengths (from the beginning or the first end to the second end of the fiber).

Thus, as shown in FIG. 2, we can thus launch the tunable light from OTDR device 10 through the first fiber end (i.e., the beginning end of the fiber 50, or the fiber end that is coupled to the buffer fiber 47), which corresponds to longer fundamental mode cutoff wavelengths. It should be noted for the distributed measurement method to work, it is preferable to launch the light through the end with longer fundamental mode cutoff wavelengths. Otherwise, once the cutoff wavelength is reached, the light can not further propagate in the fiber. However, this is not a problem, because we can always launch the light from the fiber end that has longer fundamental mode cutoff wavelength.

Using the tunable OTDR device 10, we obtained the wavelength resolved OTDR (backscatter intensity) traces as shown in FIG. 5. A reference trace RT is provided (which was acquired when no single polarization fiber 50 was attached to the OTDR device 10), in order to determine the starting position (i.e., the beginning end, or the first end) of the (single polarization) fiber 50. As is a typical case of using OTDR, a buffer fiber 47 is directly connected to the OTDR and fiber under test is further connected to the end of the buffer fiber. In this example, the buffer fiber 47 has a length of slightly over 1 km. In this embodiment, the buffer fiber 47 is SMF-28$^R$ fiber, available commercially from Corning Inc., of Corning, N.Y. The OTDR (backscatter intensity) trace of fiber 50 starts at 1.15 km, which corresponds to the starting point, or the first end of the single polarization fiber 50. The initial hump structure in the OTDR trace results from the dead zone phenomenon of OTDR. The OTDR traces shown in FIG. 5 have been obtained in six different wavelengths ranging from 1530 nm to 1560 nm. FIG. 5 illustrates that as the launched wavelength is getting higher (i.e. longer), the corresponding OTDR trace starts to drop at a shorter distance L from the fiber's first end. That means that in this embodiment, the longer fundamental mode cutoff wavelengths are situated closer to the first end of the fiber 50. In the embodiment corresponding to FIG. 5, no polarizer was inserted into the optical path, therefore the light launched into the optical fiber 50 is either un-polarized, or polarized but with the polarization direction not aligned with either one of the birefringent axes of the single polarization optical fiber 50. Therefore, both polarization modes are launched into the optical fiber 50. Thus, (without the use of a properly aligned polarizer), the observed sharp drop of backscattered light intensity is due to cutoff2 (i.e., $\lambda_{c2}$), or the cutoff associated with the polarization mode with longer fundamental mode cutoff wavelength.

The location of the fundamental mode cutoff wavelength is related to the location of the sharp drop of the OTDR trace at a given wavelength. First, we select a threshold intensity level to make the fundamental mode cutoff wavelength determinations. This threshold intensity level is typically selected at the level 3-7 dB below the intensity level of the end of the linear propagation loss region LR (see FIG. 5), or (if the fiber 50 is less than 1 km in length) 3-7 dB from the intensity level corresponding of the first end of the fiber. In this example, we select a level of 22 dB as the threshold level which corresponds to the locations of the fundamental mode cutoff wavelengths. We then obtained the fiber position corresponding to the cutoff2 at a particular fundamental mode cutoff wavelength $\lambda_{c2}$. The fundamental mode cutoff wavelength $\lambda_{c2}$ is depicted as a function of fiber position in FIG. 6a. FIG. 6b also depicts two additional (first and last on the graph) data measurements of fundamental cutoff wavelengths. These two additional measurements were obtained from the two separate transmission measurement of two short fiber sections cutoff from each fiber end. FIG. 6b shows that while the major portion of the fiber cutoff wavelength as a function of its location within the fiber follows a nearly linear trend, nonlinear change happens toward the second end of this exemplary fiber 50. This highlights the need to use the distributed cutoff measurement method. The distributed cutoff measurement method provides a direct and non-destructive method of obtaining the cutoff information of the single polarization fibers. It is possible that after certain distance the cutoff wavelengths of the single polarization shifts toward higher wavelength. In this case, the distributed measurement method can not see through the fiber portion that the fundamental mode cutoff is reached as there is no light propagating further. The portion of the fiber 50 that we can not provide a relationship between cutoff 2 wavelength $\lambda_{c2}$ versus position wavelength $\lambda_{c2}$ should be cut out and taken out for further tests. Any portion of the fiber can be measured with the wavelength $\lambda_{c2}$ as a function of fiber position L can be judged to see if they meet the specified requirement without ambiguity. If we don't use the distributed measurement and solely rely on the cutoff data from the fiber end, for example, just by only measuring the cutoff wavelengths of two fiber ends, we will not see this behavior. Thus, misjudgment of fiber cutoff wavelengths can result when the shifting of the fundamental mode cutoff wavelengths is not montonical.

Figure 6A:
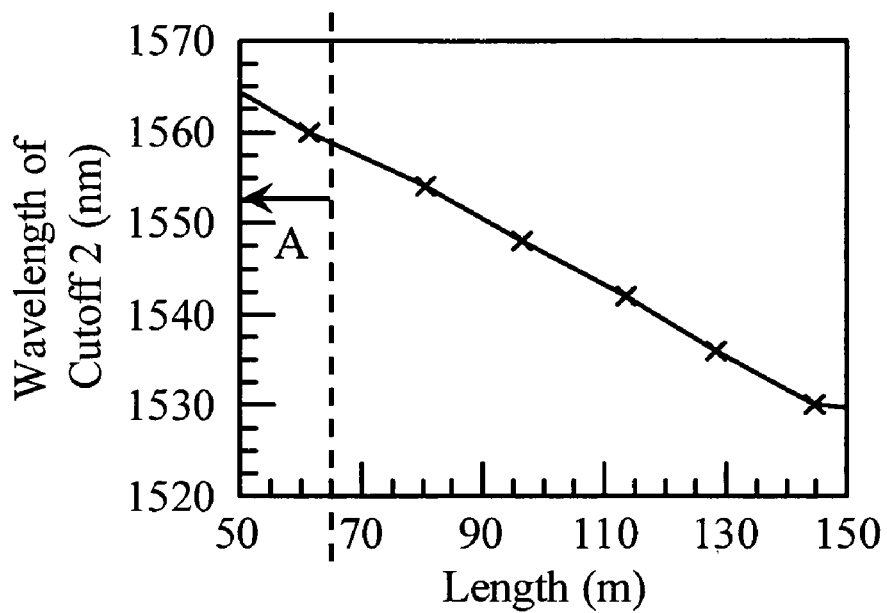
FIG. 6(a) illustrates the fundamental mode cutoff2 as a function of the fiber position as obtained from the tunable OTDR.
Figure 6B:
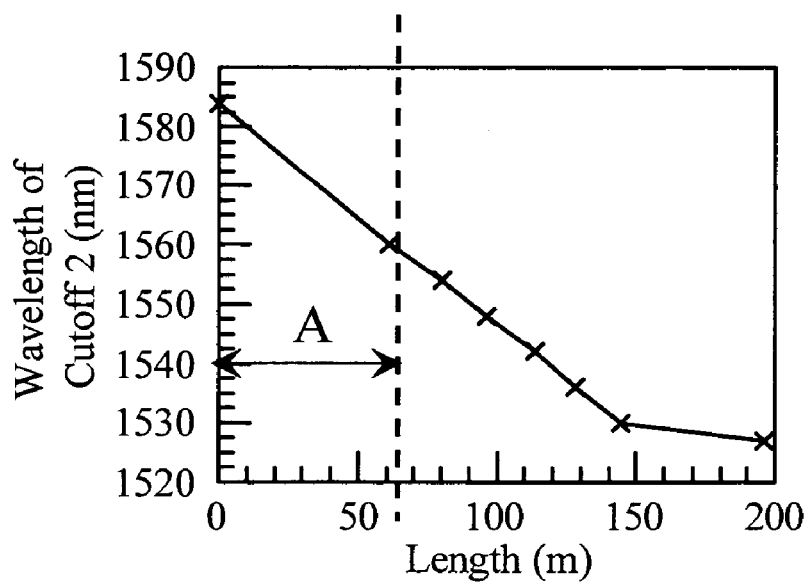
FIG. 6(b) illustrates the fundamental mode cutoff2 as a function of the fiber position with two additional data points from direct measurement results included.

The fibers that meet specific requirement (e.g. fundamental mode cutoff wavelengths, SPB width) can then be selected based on results similar to those shown in FIG. 6a. If we know the center wavelength $\lambda_{center}$ of the SP band, it is preferable to select the portion of the SP fiber such that $\lambda_{center}$ is at least 10 nm shorter then the determined cutoff wavelength $\lambda_{c2}$. More specifically, the selection can be conveniently made with further assistance of the information on the single polarization bandwidth. For example, we know that the bandwidth of the single polarization fiber is around 50 nm, thus if we want to select from the fiber 50 corresponding to FIG. 6a a portion of single polarization fiber that can operate with single polarization performance in the 1540 nm to 1560 nm range, the cutoff2 wavelength $\lambda_{c2}$ should stay above the wavelength of 1560 nm (to stay within 1560 nm requirement), and below the wavelength of 1590 nm (to retain SP wavelengths of 1540 nm and higher). Therefore, by looking at the FIG. 6a, the selected fiber portion that meets this requirement is the first 65 m of the fiber 50. Because we know that the single polarization band is about 50 nm wide, the 1540 nm wavelength will be included in the SPB of the selected fiber part.

Second Embodiment of the Present Invention

Figure 7:
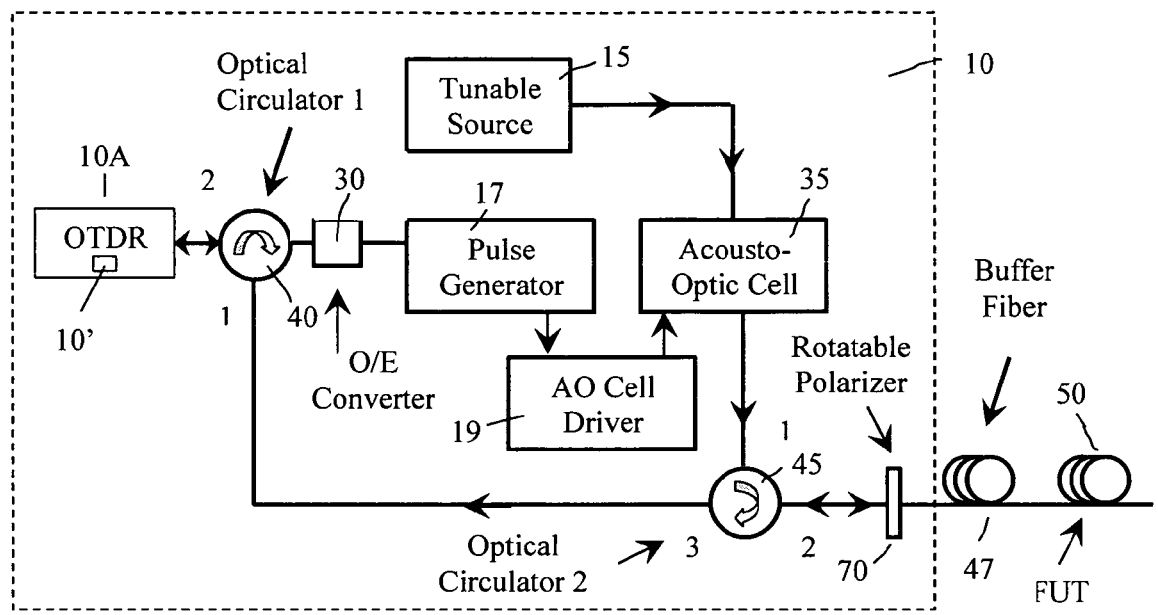
FIG. 7 illustrates a tunable OTDR which can launch the light through a particular polarization mode.

In the above embodiment, we have measured the wavelength of cutoff2 wavelength ($\lambda_{c2}$) as a function of the fiber position, and have been able to select the specific fiber of interest. With some modification to the above measurement method, we can measure directly the wavelengths corresponding to cutoff1 ($\lambda_{c1}$). In order to achieve this goal, we modify the tunable OTDR device 10 illustrated in FIG. 2 by utilizing a rotatable polarizer 70 in the tunable OTDR device 10 as now illustrated in FIG. 7. The polarizer axis should be aligned with the fiber's birefringent (i.e., polarization) axis associated with the polarization mode of the shorter cutoff wavelengths $\lambda_{c1}$, so that no light associated with the polarization mode of longer cutoff wavelength $\lambda_{c2}$ is launched into the optical fiber 50. By properly aligning the polarizer orientation, we gain sole access to the polarization mode with longer cutoff wavelength $\lambda_{c2}$. The location (P1, not shown) of sharp drop-off the backscatter intensity signal detected by the OTDR device depends on the orientation of the polarizer's polarization axis. When the polarizer transmits the polarization mode associated with $\lambda_{c2}$, the location of the sharp drop-off of OTDR signals occurs at a shorter distance within the fiber (i.e. closer to the first end of the fiber). When the polarizer transmits the polarization mode associated with the cutoff wavelengths $\lambda_{c2}$, the location of the sharp drop-off of OTDR signals (P2) occur at a longer distance from the light launch end (i.e. further from the first end of the fiber 50). In any other polarizer orientation, the sharp drop-off of OTDR signals occurs at a position situated between P1 and P2. Therefore, one way to adjust the orientation of the polarizer axis (which is to be aligned with the polarization mode corresponding to the cutoff wavelength $\lambda_{c1}$) is to watch the backscattered light intensity as in the above example, and then find polarizer orientation (by slowly rotating the polarizer) corresponding to the sharp drop-off of the backscattered light intensity which happens at a distance closest to the light launching end (i.e., first fiber end). When the polarizer is well aligned, essentially no light is launched into the fiber through the polarization mode associated with the cutoff2 wavelength ($\lambda_{c2}$), so that we can solely access the cutoff1 wavelength $\lambda_{c1}$.

More specifically, when no backscattered light is detected at the intensity level with the polarization mode associated with cutoff2 wavelength $\lambda_{c2}$, the detection is made only of cutoff1 (fundamental cutoff wavelength $\lambda_{c1}$). When the polarizer orientation, which transmits polarization mode associated with only $\lambda_{c1}$ is found, the polarizer orientation that can transmits polarization mode with $\lambda_{c2}$ is also known, because to transmit the fundamental cutoff wavelength $\lambda_{c2}$ the polarizer is rotated by 90 degrees relative to its orientation for transmitting the fundamental cutoff wavelength $\lambda_{c1}$. Alternatively, we can also first-find the polarizer angle that transmits the polarization mode with $\lambda_{c2}$ by searching for a polarizer angle that corresponding to the sharp drop-off of the backscattered light intensity which happens at a distance farthest to the light launching end (i.e., first fiber end).

As described earlier, the cutoff wavelengths $\lambda_{c1}$, $\lambda_{c2}$ of single polarization fibers are very sensitive to small changes in the fiber geometry. One can draw a long fiber 50 and then select a section of this fiber that satisfies the requirements for $\lambda_{c1}$, $\lambda_{c2}$ by utilizing the above described measurement method. One can also change the draw conditions such as draw speed, tension and temperature, as well as pressure in the air hole to tune the single location and width of single polarization band SPB.

Third Embodiment of the Present Invention

Figure 8A:
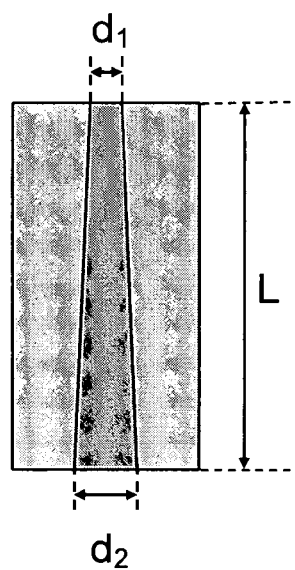
FIG. 8(a) illustrates the schematic of a tapered fiber preform.
Figure 8B:
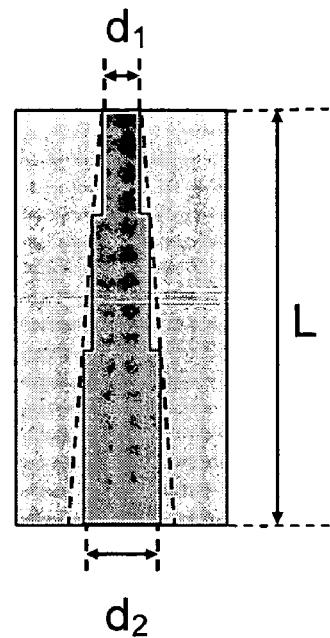
FIG. 8(b) illustrates an alternative implementation of a tapered fiber preform.
Figure 11:
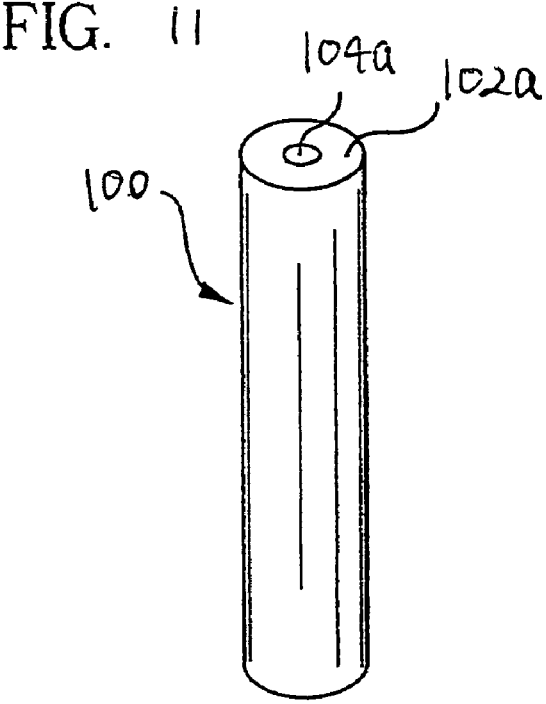
FIG. 11 is a schematic drawing illustrating one embodiment of a core cane.
Figure 12:
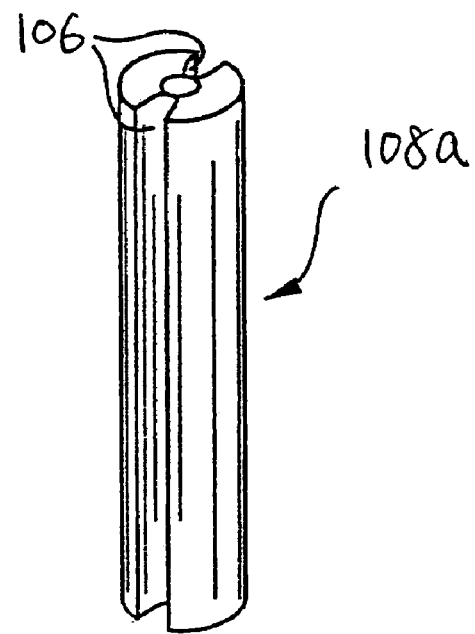
FIG. 12 illustrates schematically a grooved cane made from the core cane of FIG. 11.
Figure 13:
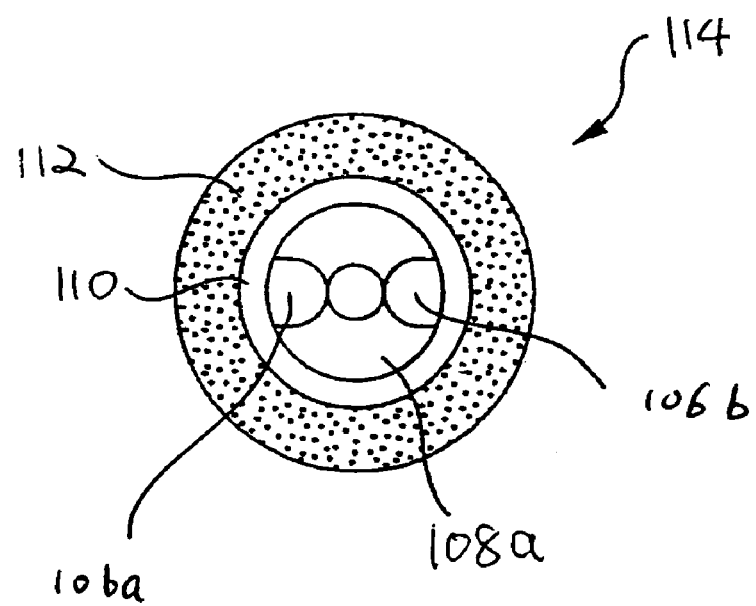
FIG. 13 illustrates one embodiment of the preform subassembly that utilizes the grooved cane of FIG. 12.
Figure 14:
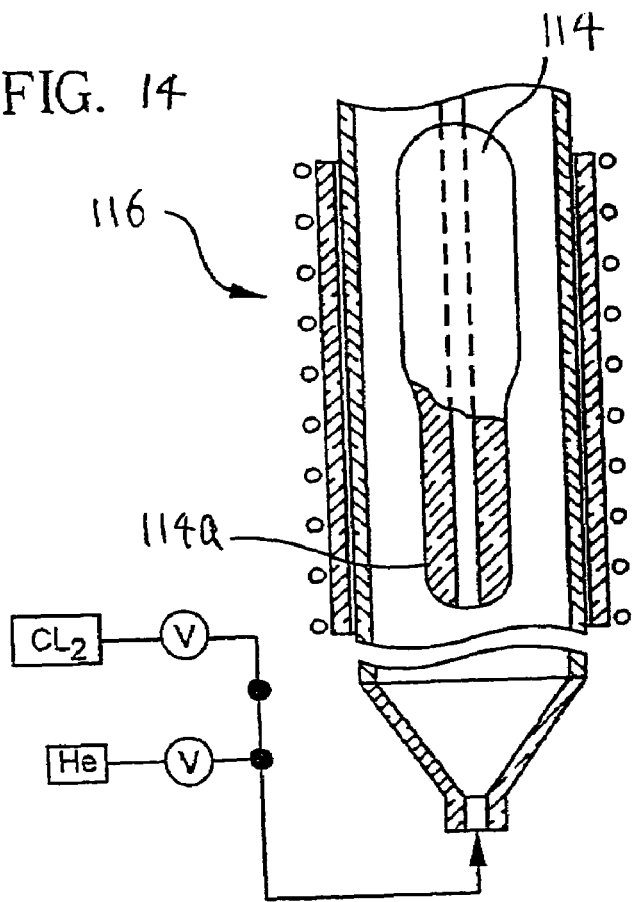
FIGS. 14 and 15 are schematic side isometric views of a core cane used to manufacture the single polarization fibers in accordance with the invention.
Figure 15:
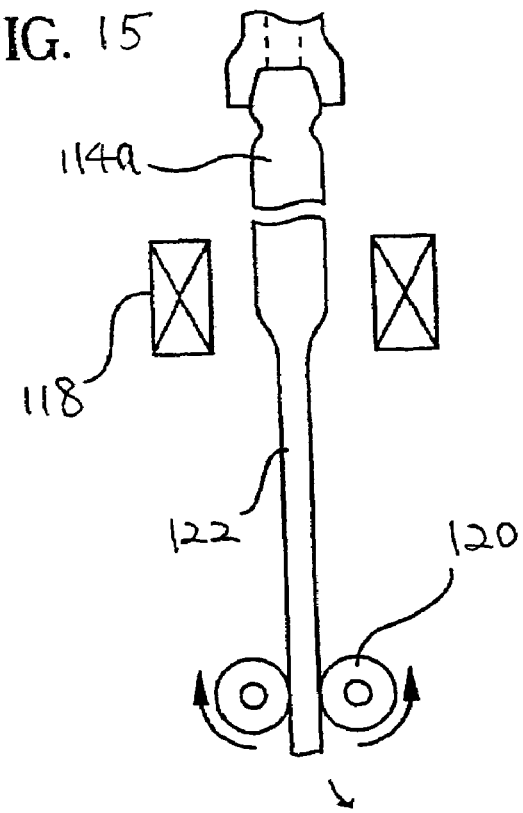
Figure 16:
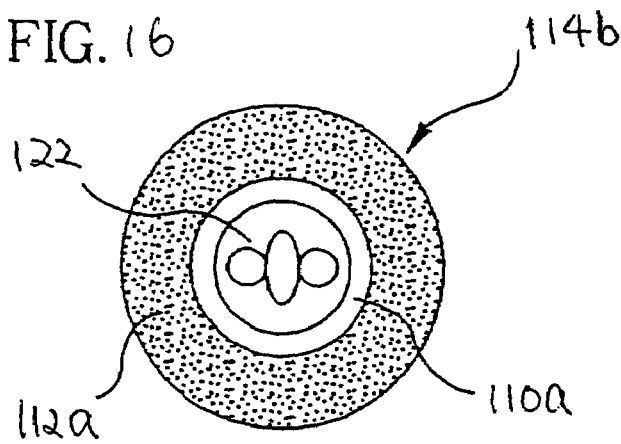
FIG. 16 is an end view of a preform subassembly used to manufacture the single polarization fibers in accordance with the invention.
Figure 17:
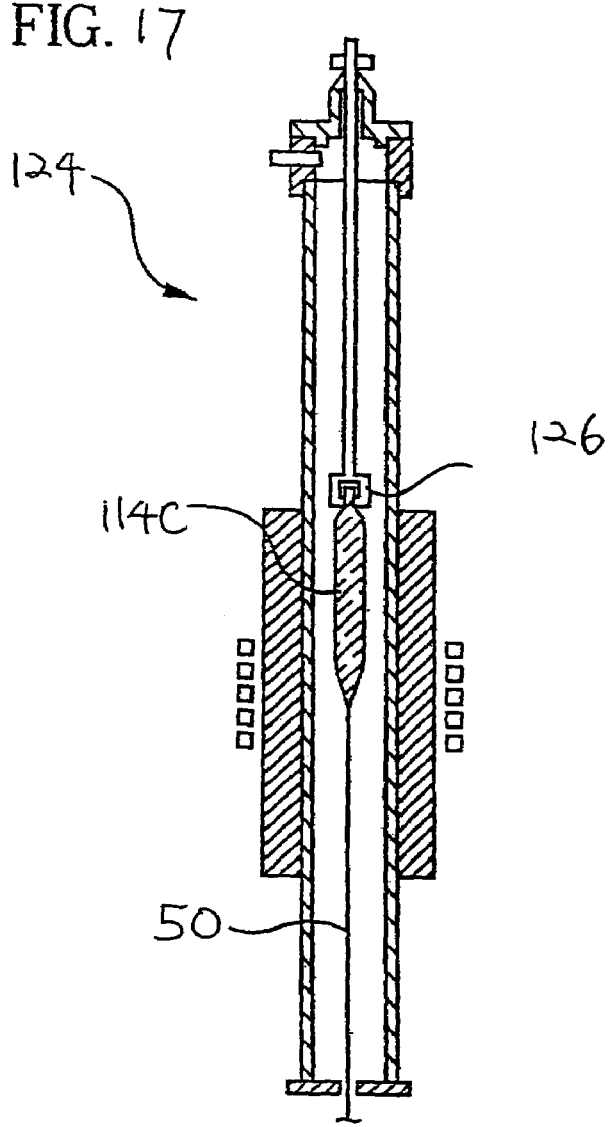
FIG. 17 is a partially cross-sectioned side view of the preform subassembly mounted in a consolidation furnace.

The distributed cutoff measurement method can be used in conjunction with a preform that has a tapered core, to improve the yield of manufacturing of the single polarization fibers. First, we obtain or manufacture a fiber preform that has a predetermined taper of the core size. FIG. 8a shows a schematic cross-section of an exemplary preform, where d1 and d2 are average core diameters of the two ends, and L is the length of preform. In this example, the taper has linear change along the preform. Such a tapered preform is formed utilizing the following method of manufacturing. First, a core cane 100, as shown in FIG. 11, is provided having the proper germania-doped core delta, Δ1, in the central core 104a of between about 0.5-2.5%, and an annular region 102a doped with fluorine surrounding the core 104a having a delta, Δ2, of between about −0.05 to −0.75%. The core cane 100 was preferably 1 meter long and about 42 mm in diameter. Grooves 106 are then ground into the diametrically opposite longitudinal sides of the cane 100 to a width of about 13 mm and a depth of about 7 mm, as illustrated in FIG. 12, thereby forming grooved cane 108a. The groove depth should be such that its bottom substantially abuts the central core 104a. The ground core cane 108a is then etched in HF for about 30 minutes to remove grinding debris. The ground and etched cane 108a is then inserted into a 1 meter long silica tube 110 overclad with about 800 grams of silica soot overcladding 112 as shown in FIG. 13 to form a perform subassembly 114. Silica soot overcladding 112 may be produced by an Outside Vapor Deposition (OVD) method, for example. The preform subassembly 114 of FIG. 13 is then consolidated in accordance with a conventional consolidation process as shown in FIG. 14 by first drying in a consolidation furnace 116 in an atmosphere of $Cl_2$, and then consolidating in the furnace in a He-containing atmosphere to produce a consolidated preform 114a. The consolidated preform 114a is then inserted into a redraw tower as shown in FIG. 15. Heat is applied to preform 114a by heating element 118 and tapered core cane is drawn down by continuously changing tension in wheels 120 into an approximately 7-6.98 mm diameter core cane 122. While the redraw process (drawing to a smaller diameter core cane from the preform) is occurring, a positive pressure is applied to the holes 106a, 106b (which are shown in FIG. 13) at the level sufficient to keep them from closing. The pressure may be sufficient to cause the central core to elongate slightly. The pressure used is a function of the draw temperature, glass viscosity, and draw speed among other factors. This tapered core cane 122, now having an elliptically shaped central core and air holes, is again inserted into a 1 meter long silica tube 110a overclad with about 1000 grams of silica soot overcladding 112a as shown in FIG. 16 to form preform subassembly 114b. This preform subassembly is consolidated in the same manner as heretofore described. The final tapered consolidated preform 114c is then suspended from a handle 126 in a draw furnace 124 as shown in FIG. 17 and a fiber 50 is drawn therefrom. During draw, a small positive pressure is applied to the holes to cause the core to become elliptically shaped. As should be recognized, the elongation of the core may occur in the redraw step, the draw step, or combinations thereof to achieve the desired aspect ratio of the central core. In either case, a positive pressure is applied to the holes in the preform (and fiber) to cause the elongation to occur. Tapered core can be also achieved by making step change in core diameter as shown in FIG. 8b. Such a tapered preform with step change in core diameter is formed in a similar way to the method of making a tapered perform as above, except for the redraw step. This type of tapered core cane is drawn down by step changing tension in wheels 120 of FIG. 15, which results in 6.98, 6.99 and 7 mm diameter core cane 122. The taper rate is defined as (d2−d1)/L. Preferably, the taper is greater than 0.025%, more preferably in the range between 0.05% and 0.15%. The fiber preform is then drawn into fiber 50. Because the fiber core size is tapered, the fundamental mode cutoff wavelength will change within the fiber based on the distance from the first end, and at least one section of the fiber will have a single polarization window within the target range. Therefore at least a portion of the fiber will have the desired single polarization cutoff wavelengths. The method is even robust against the natural fluctuation of the fiber geometry along the fiber preform, as there is no guarantee that the natural fluctuation will cover the desired parameter window. Then one of distributed cutoff measurement method described above can be used to select the desired length of the single polarization fiber. The selected portion of the fiber can be cut off, and will operate in a desired wavelength range.

Figure 9:
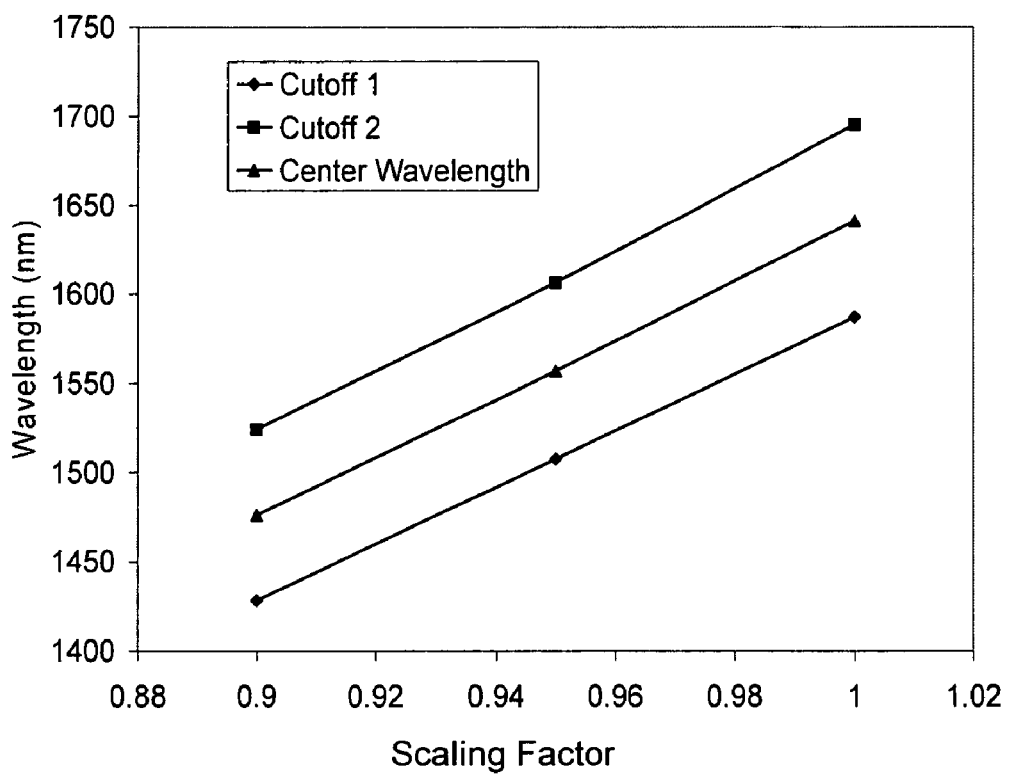
FIG. 9 illustrates the dependence of the wavelengths of the fundamental mode cutoff1 and cutoff2 and the center wavelength on the scaling factor.

To illustrate the performance of the fiber 50 manufactured from the tapered core preform, we have calculated cutoff wavelength changes of a dual hole single polarization fiber with the tapering fiber core dimensions as shown in FIG. 9. The fiber 50 has a core 50A with relative refractive index delta of 1%. The scaling factor of 1 corresponds to the fiber 50 with the core major axis of 9 μm, the core minor axis of 3.3 μm, and the 9 μm diameter air holes 50B. FIG. 9 illustrates that the cutoff wavelengths change linearly with the scaling factor. For example, a 1% change in the scaling factor corresponds to about 16 nm shift in the cutoff wavelengths.

In this embodiment, we make a 1 meter long preform by overcladding a tapered core cane. The diameters of the core cane at the two ends are 9 mm and 10 mm, respectively. This corresponds to a 10% change in core dimensions ((10 mm-9 mm)/10 mm=10%), or 10% change in scaling factor. The 10% change in core dimensions, over the preform length of 1 meter, corresponds to the taper rate of 0.1% (i.e. 1 mm/1000 mm). The preform diameter is selected to draw 30 km of optical fiber 50. According to FIG. 9, for 10% change in scaling factor described above, the cutoff wavelengths change by about 165 nm over the fiber length of 30 km. If the allowable change of the fundamental mode cutoff wavelengths $\lambda_{c1}$, $\lambda_{c2}$ is +/−15 nm, the length of the fiber within the target range is 5.45 km (i.e., (15×2/165)×30 km=5.45 km). The yield in this exemplary embodiment is 18% (i.e. 5.45/30). The fiber section can be selected using the OTDR measurement technique described above.

Fourth Embodiment of the Present Invention

Online monitoring utilizing OTDR or tunable OTDR can help us to judge the single polarization performance (specifically the cutoff wavelength $\lambda_{c2}$) during fiber draw process. In certain case, it can provide feedback information or signals on how to adjust the draw parameters. The online monitoring can be applied to either standard (non-tapered) preform or specially tapered preform described in the third embodiment.

Figure 10A:
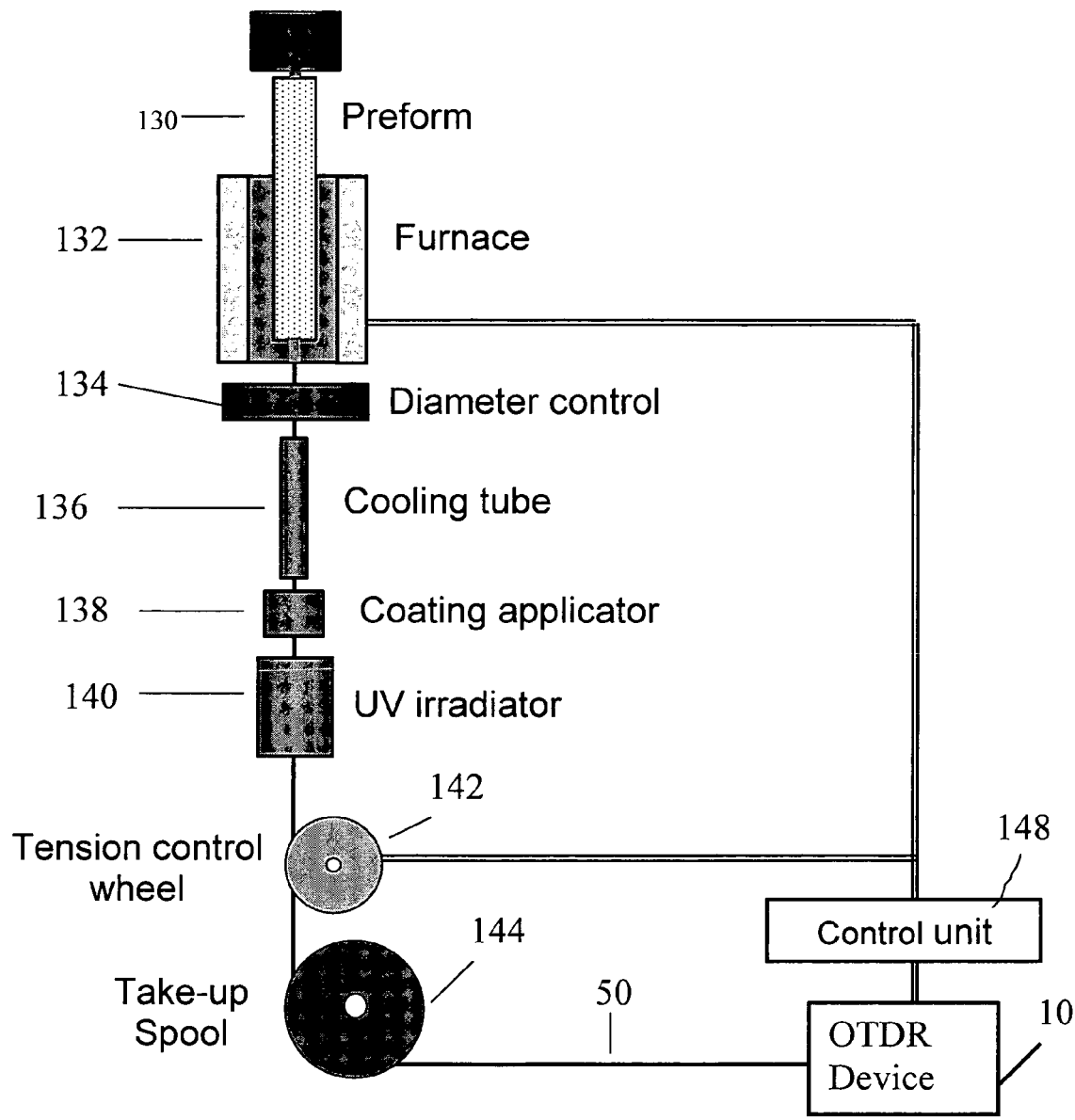
FIG. 10a is a schematic illustrating online monitoring of single polarization fiber's cutoff wavelengths, using OTDR measurement while the fiber is being drawn. This figure also illustrates that feedback is provided from the OTDR measurement to adjust fiber draw parameters.

In the case of online monitoring of non-tapered preform, the standard (non-tapered) preform, 130 is utilized in conjunction with the tunable OTDR device, 10 to achieve online monitoring of single polarization cutoff wavelengths and real time process control for single polarization fiber drawing as shown in FIG. 10a. Light from an OTDR device 10 is coupled into the single polarization fiber 50 in order to measure the single polarization cutoff wavelength, $\lambda_{c2}$ or, if polarizer is utilized $\lambda_{c2}$ and $\lambda_{c1}$.

We can start with the draw parameters that can yield cutoff wavelengths higher (longer) than the desired cutoff wavelength $\lambda_{c2}$. For example if the desired cutoff wavelength $\lambda_{c2}$=1590 nm (to ensure for example that we will be able to obtain single polarization fiber with target operating window between 1540 nm and 1560 nm), we can start by draw the SP fiber with $\lambda_{c2}$ higher than 1590 nm. We then smoothly adjust the draw parameters, such as draw temperature, tension, speed and air pressure so that the cutoff wavelengths $\lambda_{c2}$ and $\lambda_{c1}$ would shifts smoothly toward lower values (i.e. shorter wavelengths) until we reach the desired cutoff wavelength of 1590 nm. In this embodiment we set the OTDR operating wavelength provided by the tunable OTDR source at 1590 nm. Thus, when the fiber cutoff wavelength $\lambda_{c2}$ is above 1590 nm, the OTDR device 10 would be able to detect (linear) backscattered light from the fiber, but when the cutoff wavelength $\lambda_{c2}$ is below 1590 nm, detection will not be possible. Thus, we continue draw the fiber while watching the OTDR signals till the backscattered light intensity drop off significantly, for example, by more than 5-7 dB, which indicates that the fundamental mode cutoff wavelength $\lambda_{c2}$ had reached 1590 nm and has moved just below 1590 nm. At this moment, we can lock the draw parameters. It should be noted that since OTDR device 10 has a limited reach (i.e., can detect backscattered light through a specific distance) which is affected by the attenuation level of the single polarization fiber and the amount of light that can be coupled into the fiber. When the fiber attenuation is high and/or the coupling efficiency is low, it is necessary after drawing a certain length of fiber (for example, 1 km) that we unload the fiber already drawn by cutting it off and moving it off the take-up spool. Then we take the end of the fiber that just come out from the draw and couple it into the OTDR device 10.

In this example, the tunable OTDR device 10 to provide the wavelength of 1590 nm. In other embodiments, it is possible that the desired OTDR operating wavelength be 1550 nm, which is what is available from commercial OTDR device 10a. When this happens, we can simply use a commercial OTDR 10a operating at 1550 nm instead of the tunable OTDR device 10 (see, for example FIG. 2).

In the above, we used only one wavelength for the online monitoring. Monitoring at more than one wavelength can also be incorporated as an option to provide additional information. In the above example, we can add a wavelength of 1560 nm to the OTDR measurement to ensure that the $\lambda_{c2}$ does not drop below 1560 nm. When we can observe backscattered light at 1560 nm, the cutoff wavelength $\lambda_{c2}$ is above 1560 nm. When essentially no backscattered light is observed, $\lambda_{c2}$ is below 1560 nm, a feedback to the draw parameters is provided to move the $\lambda_{c2}$ back to the desired region of between 1560 nm and 1590 nm. We can adopt the same method to monitor fiber that is designed for other wavelength window such as around 1310 nm or around 1060 nm. We can also adopt the method to draw fiber with different operation band for example, when the target operating wavelengths are from 1535 nm to 1565 nm. The wavelengths used for monitoring can be adjusted to be 1585 nm and/or 1565 nm.

Fifth Embodiment of the Present Invention

Figure 10B:
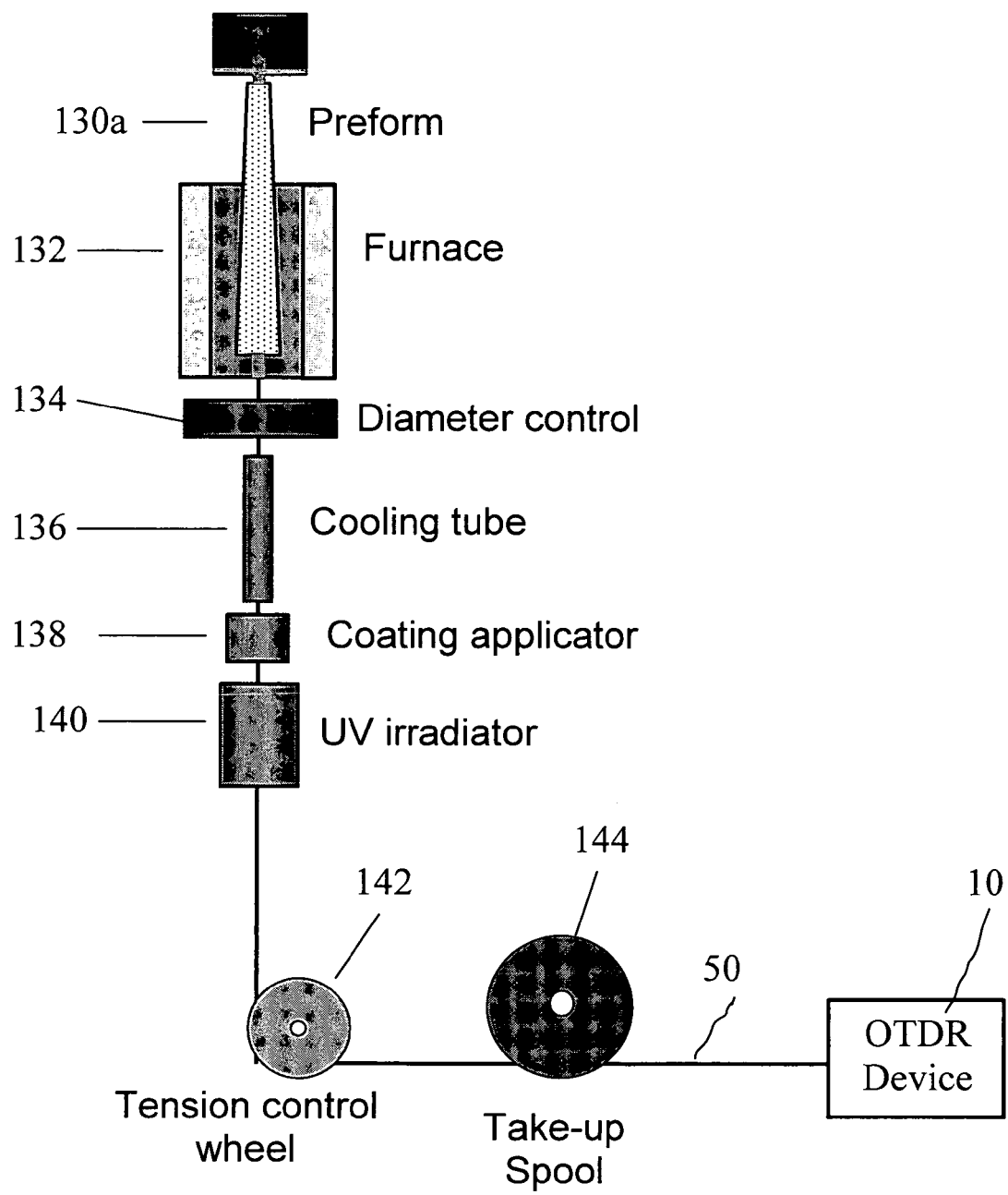
FIG. 10b is a schematic illustrating online monitoring of single polarization fiber's cutoff wavelengths using tapered preform and OTDR measurement while the single polarization fiber is being drawn. No feedback is provided from the OTDR device in this embodiment.

As described in the third embodiment in this application, tunable OTDR device 10 may be utilized in conjunction with tapered preform 130a to achieve online monitoring of single polarization cutoff wavelengths as shown in FIG. 10b. In order to perform online OTDR monitoring, it is necessary to draw the fiber from tapered core preform's end with the larger core size. Light from an OTDR device 10 is then coupled into the fiber 50 to monitor the single polarization cutoff wavelength. The draw parameters are kept the same or locked over the whole fiber drawing process. No feedback (similar to that described in conjunction with embodiment 4) is necessary because the tapered preform when drawn will result in a fiber that has at least one portion that meets specifications.

Using the online monitoring the portion of the drawn fiber in which single polarization cutoff wavelength is within predetermined wavelength range can be easily selected. When the single polarization cutoff wavelength $\lambda_{c2}$ shifted below the desired window, there is no need to draw the remaining portion of the fiber so that cost and efforts can be reduced. This is a significant benefit for large volume production which eliminate post-measure step.

One special issue that requires some care is the coupling of light into the fiber that is still being drawn. The fiber end still rotates as the fiber is being drawn and as the new fiber is being put on the take-up spool. Several approaches can be adopted for the coupling of the single polarization fiber 50 to the buffer fiber 47 shown in FIG. 2. One way is to mount the fiber end into a rotating mount and perform a free space launch.

In another approach, one can use a commercial mechanical splicer that utilizes a fiber holding gel. Such coupler is available, for example, from Corning Cable Systems. The mechanical splicer holds the free end of the single polarization fiber 50 as well as the corresponding end of the buffer fiber 47. The free end of single polarization fiber 50 is freely rotating inside the gel while the gel holds this fiber and ensures efficient coupling of light into the single polarization fiber 50 through buffer fiber 47 (e.g. a standard single mode pigtail fiber).

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A method for measuring fundamental mode cutoff wavelength of single polarization fiber comprising:
   1) sequentially launching pulsed light of multiple wavelengths $\lambda_i$ into one end of the single polarization fiber;
   2) sequentially measuring backscattered light intensity corresponding to each of said multiple wavelengths to obtain the backscattered light intensity as a function of fiber position at each wavelength, wherein the backscattered light propagates through the same end of the fiber; and
   3) determining the fundamental mode cutoff wavelengths and the corresponding positions within said fiber for each of the cutoff wavelengths, based on a specified threshold of light intensity level.

2. The method of claim 1, wherein the specific threshold of light intensity level used to determine each of the fundamental mode cutoff wavelengths is 3-5 dB below the light intensity level at the end of the linear propagation loss region LR of the single polarization fiber.

3. The method of claim 1, said method further comprising the step of: selecting a portion of the single polarization fiber that has a single polarization band SPB such that such portion of the single polarization fiber is selected based on the determined fundamental mode cutoff wavelengths and their corresponding positions.

4. The method of claim 1, said method further comprising the step of selecting a portion of the single polarization fiber that has a single polarization band center wavelength $\lambda_{center}$, such that $\lambda_{center}$, is at least 10 nm shorter then the determined fundamental mode cutoff wavelength.

5. The method of claim 1, wherein: at least one polarizer is utilized to transmit one polarization mode into the fiber and fundamental mode cutoff wavelengths and their corresponding positions are determined for this polarization mode.

6. The method of claim 5, said method further comprising the step of: selecting a portion of the single polarization fiber that has a single polarization band SPB such that such portion of the single polarization fiber is selected based on the determined fundamental mode cutoff wavelengths and their corresponding positions.

7. The method of claim 1, said method further utilizing a tunable OTDR device.

8. A method for selecting a length of single polarization fiber comprising:
   (1) making a preform with a predetermined tapered core size;
   (2) drawing the preform into single polarization fiber; and
   (3) screening the fiber to determine the section of fiber meeting a predetermined target single polarization wavelength range by utilizing an OTDR device and the measurement method of claim 1.

9. A method for measuring fundamental mode cutoff wavelength of single polarization fiber comprising:
   (i) launching pulsed light of at least one wavelength $\lambda_i$ into one end of the single polarization fiber;
   (ii) measuring backscattered light intensity corresponding to said wavelength to obtain the backscattered light intensity as a function of fiber position, wherein the backscattered light propagates through the same end of the single polarization fiber; and
   (iii) determining at least one fundamental mode cutoff wavelength and the corresponding position within said single polarization fiber for the fundamental mode cutoff wavelength, based on a specified threshold light intensity level.

10. The method of claim 9 wherein said method is utilized during fiber draw.

11. The method of claim 9, said method further utilizing an OTDR device.

12. A method for selecting a length of single polarization fiber comprising:
   (1) drawing a preform into single polarization fiber, wherein said preform has predetermined tapered core size; and
   (2) screening the single polarization fiber to determine the section of single polarization fiber meeting a predetermined target wavelength range by utilizing an OTDR device and the measurement method of claim 9.

13. A method for making single polarization fiber comprising:
   (1) making a preform;
   (2) drawing the preform into the single polarization fiber;
   (3) measure the fiber's fundamental mode cutoff wavelength using an OTDR device and the method of claim 9 to determine the single polarization window wavelength position; and
   (4) change draw conditions to tune the single polarization window close to the target wavelength range.

14. The method of claim 13, wherein said perform is a non-tapered perform.

15. A method for making single polarization fiber comprising:
   (1) making a preform with a predetermined taper core size;
   (2) drawing the preform starting from the large core end;
   (3) measure the single polarization fiber's fundamental cutoff wavelength using an OTDR device and the method of claim 9 to determine the single polarization window wavelength position.

16. A single polarization fiber made by the method of claim 15.

17. The method of claim 15, wherein the preform taper rate is greater than 0.025%.

18. The method of claim 15, wherein the preform taper rate is greater than 0.1%.

* * * * *